US007502366B1

(12) United States Patent
Erimli et al.

(10) Patent No.: US 7,502,366 B1
(45) Date of Patent: Mar. 10, 2009

(54) ARRANGEMENT IN A NETWORK SWITCH FOR PRIORITIZING DATA FRAMES BASED ON USER-DEFINED FRAME ATTRIBUTES

(75) Inventors: Bahadir Erimli, Campbell, CA (US); Gopal S. Krishna, San Jose, CA (US); Chandan Egbert, San Jose, CA (US); Peter Ka-Fai Chow, San Jose, CA (US); Mrudula Kanuri, Santa Clara, CA (US); Shr-Jie Tzeng, Fremont, CA (US); Somnath Viswanath, Sunnyvale, CA (US); Xiaohua Zhuang, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/576,021

(22) Filed: May 23, 2000

(51) Int. Cl.
*H04L 12/28* (2006.01)
(52) U.S. Cl. ...................................... 370/389
(58) Field of Classification Search ......... 370/384–401, 370/377, 375, 363, 469, 428, 517, 412, 232, 370/235, 252, 229, 218, 539, 538, 379, 382, 370/423, 236, 414, 468, 230, 276, 286, 417, 370/493, 351; 709/230, 320, 103, 223, 220, 709/245, 229, 228, 226, 239, 238, 214, 235, 709/224, 250; 710/105, 63, 308; 725/31, 725/6, 63–72; 379/221, 189, 208.01, 156, 379/406, 392; 345/115; 714/47; 358/1.15
See application file for complete search history.

(56) References Cited

U.S. PATENT DOCUMENTS 3,818,458 A * 6/1974 Deese ........................ 714/47

(Continued)

OTHER PUBLICATIONS

Jong Suk Ahn, Peter B. Danzig; Packet Network Simulation: Speedup and Accuracy Versus Timing Granularity, Oct. 1996 IEEE/ACM Transactions on Networking (TON), vol. 4 Issue 5, pp. 743-757.*

(Continued)

*Primary Examiner*—Wing F Chan
*Assistant Examiner*—Prenell P Jones
(74) *Attorney, Agent, or Firm*—Manelli Denison & Selter PLLC; Leon R. Turkevich

(57) ABSTRACT

A network switch includes network switch ports, each including a port filter configured for detecting user-selected attributes from a received layer 2 type data frame. Each port filter, upon detecting a user-selected attribute in a received layer 2 type data frame, sends a signal to a switching module indicating the determined presence of the user-selected attribute, enabling the switching module to generate a switching decision based on the corresponding user-selected attribute and based on a corresponding user-defined switching policy. The switching policy may specify a priority class, or a guaranteed quality of service (e.g., a guaranteed bandwidth), ensuring that the received layer 2 type data frame receives the appropriate switching support. The user-selected attributes for the port filter and the user-defined switching policy for the switching module are programmed by a host processor. Hence, the integrated network switch is able to perform advanced switching operations for layer 2 type data packets to ensure quality of service requirements, independent of priority information specified in the layer 2 type data packets, based on the user-selected attributes in the layer 2 type data packets and the user-defined switching policies established for the switching module.

20 Claims, 4 Drawing Sheets

U.S. PATENT DOCUMENTS

| | | | | |
|---|---|---|---|---|
| 5,231,494 | A * | 7/1993 | Wachob | 348/385.1 |
| 5,282,207 | A * | 1/1994 | Jurkevich et al. | 370/468 |
| 5,485,455 | A * | 1/1996 | Dobbins et al. | 370/255 |
| 5,732,082 | A * | 3/1998 | Wartski et al. | 370/395.6 |
| 5,748,627 | A * | 5/1998 | Weir | 370/384 |
| 5,784,369 | A * | 7/1998 | Romiti et al. | 370/358 |
| 5,790,546 | A * | 8/1998 | Dobbins et al. | 370/400 |
| 5,812,656 | A * | 9/1998 | Garland et al. | 379/208.01 |
| 5,828,664 | A * | 10/1998 | Weir | 370/375 |
| 5,857,113 | A * | 1/1999 | Muegge et al. | 710/10 |
| 5,930,295 | A * | 7/1999 | Isley et al. | 375/219 |
| 5,953,335 | A | 9/1999 | Erimli et al. | |
| 6,111,875 | A * | 8/2000 | Kerstein et al. | 370/389 |
| 6,115,385 | A * | 9/2000 | Vig | 370/401 |
| 6,141,410 | A * | 10/2000 | Ginzboorg | 379/221 |
| 6,175,569 | B1 * | 1/2001 | Ellington et al. | 370/401 |
| 6,360,255 | B1 * | 3/2002 | McCormack et al. | 709/221 |
| 6,389,016 | B1 * | 5/2002 | Sabaa et al. | 370/389 |
| 6,424,658 | B1 * | 7/2002 | Mathur | 370/429 |
| 6,570,851 | B1 * | 5/2003 | Koskelainen et al. | 370/231 |
| 6,570,876 | B1 * | 5/2003 | Aimoto | 370/389 |
| 6,574,195 | B2 | 6/2003 | Roberts | |
| 6,574,321 | B1 * | 6/2003 | Cox et al. | 379/189 |
| 6,611,519 | B1 * | 8/2003 | Howe | 370/386 |
| 6,625,121 | B1 * | 9/2003 | Lau et al. | 370/230 |
| 6,647,428 | B1 * | 11/2003 | Bannai et al. | 709/245 |
| 6,665,302 | B2 * | 12/2003 | Lee | 370/395.42 |
| 6,674,769 | B1 * | 1/2004 | Viswanath | 370/469 |
| 6,697,380 | B1 * | 2/2004 | Egbert et al. | 370/469 |
| 6,701,405 | B1 * | 3/2004 | Adusumilli et al. | 710/308 |
| 6,714,542 | B1 * | 3/2004 | Tzeng et al. | 370/392 |
| 6,724,779 | B1 * | 4/2004 | Alleyne et al. | 370/517 |
| 6,728,246 | B1 * | 4/2004 | Egbert et al. | 370/392 |
| 6,728,255 | B1 * | 4/2004 | Tzeng | 370/428 |
| 6,751,662 | B1 * | 6/2004 | Natarajan et al. | 709/223 |
| 6,795,860 | B1 * | 9/2004 | Shah | 709/229 |
| 6,807,179 | B1 * | 10/2004 | Kanuri et al. | 370/395.31 |
| 6,862,265 | B1 * | 3/2005 | Appala et al. | 370/235 |
| 6,906,998 | B1 * | 6/2005 | Mujeeb et al. | 370/218 |
| 6,959,006 | B1 * | 10/2005 | Sarnikowski et al. | 370/468 |
| 7,012,919 | B1 * | 3/2006 | So et al. | 370/392 |
| 7,210,158 | B1 * | 4/2007 | Forler | 725/31 |

OTHER PUBLICATIONS

Kornaros, G. et al; ATLAS I: implementing a single-chip ATM switch with backpressure Micro, IEEE; vol. 19, Issue 1, Jan.-Feb. 1999 pp. 30-41.*

* cited by examiner

ARRANGEMENT IN A NETWORK SWITCH FOR PRIORITIZING DATA FRAMES BASED ON USER-DEFINED FRAME ATTRIBUTES

BACKGROUND OF THE INVENTION

1. Field of the Invention

The present invention relates to switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of layer 2 type data packets. A layer 2 type data flame (also referred to as a layer 2 type data packet) is defined as a data frame having a layer 2 header (e.g., Ethernet), a corresponding payload, and a cyclic redundancy check field (also referred to as a frame check sequence field) having a value based on the layer 2 header and the corresponding payload. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

A newer protocol, known as IEEE 802.1q enables a transmitting network node to specify a VLAN tag having a priority for the layer 2 type data packet: for example, the VLAN tag includes a Tag Control Information (TCI) field that includes a three-bit user priority field. Hence, newer network interface devices capable of transmitting layer 2 type data packets according to IEEE 802.1q protocol enable the network switch to perform priority based switching based on layer 2 information.

Unfortunately, legacy devices (i.e., devices implemented before establishment of the IEEE 802.1q protocol) are unable to transmit layer 2 type data packets according to the new standard; hence, the legacy devices are unable to specify for a network switch whether a transmitted data frame has a priority status for switching purposes. Moreover, instances may arise where the switching of layer 2 type data frames by a network switch need to be prioritized based on criteria other than the presence of priority information within a received layer 2 type data frame. For example, one network station may output a layer 2 type data frame specifying a high priority, however the network switch receiving the layer 2 type data frame may have different traffic requirements that override the high priority designation by the one network station.

SUMMARY OF THE INVENTION

There is a need for an arrangement that enables a network switch to perform priority based switching of untagged layer 2 type data packets. In particular, there is a need for an arrangement that enables a network switch to perform prioritization of untagged layer 2 type data packets received from network devices that are unable to specify priority information according to IEEE 802.1q protocol.

There is also a need for an arrangement in a network switch that enables layer 2 type data packets to be switched according to a user defined protocol. For example, there is a need for an arrangement in a network switch that enables a user to select prioritization of layer 2 type data frames based on identification of any one of a prescribed network switch port receiving a layer 2 type data packet, a prescribed source address within the layer 2 type data packet, a prescribed destination address within the layer 2 type data packet, or identification of the layer 2 type data packet as belonging to a prescribed data flow.

These and other needs are attained by the present invention, where a network switch includes network switch ports, each including a port filter configured for detecting user-selected attributes from a received layer 2 type data frame. Each port filter, upon detecting a user-selected attribute in a received layer 2 type data frame, sends a signal to a switching module indicating the determined presence of the user-selected attribute, enabling the switching module to generate a switching decision based on the corresponding user-selected attribute and based on a corresponding user-defined switching policy. The switching policy may specify a priority class, or a guaranteed quality of service (e.g., a guaranteed bandwidth), ensuring that the received layer 2 type data frame receives the appropriate switching support. The user-selected attributes for the port filter and the user-defined switching policy for the switching module are programmed by a host processor. Hence, the integrated network switch is able to perform advanced switching operations for layer 2 type data packets to ensure quality of service requirements, independent of priority information specified in the layer 2 type data packets, based on the user-selected attributes in the layer 2 type data packets and the user-defined switching policies established for the switching module.

One aspect of the present invention provides a method including receiving data frame by an integrated network switch, and switching the data frame by the integrated network switch to an output port according to a user-defined policy and based on a user-selected attribute of the data frame. The user-defined policy specifies the manner in which the data frame is to be switched by the integrated network switch, for example if the data frame needs to be switched according to a guaranteed minimum latency, a guaranteed quality of service, a minimum bandwidth, etc. In addition, the switching of the data frame based on a user-selected attribute of the data frame provides maximum flexibility in determining how the data frame should be processed, independent of whether the data frame includes any priority tag information.

Another aspect of the present invention provides a network switching system. The network switching system includes an integrated network switch and a host processor. The integrated network switch includes a plurality of network switch ports, each network switch port including a port filter configured for determining a presence of a user-selected attribute in a received layer 2 type data frame and outputting a signal indicating the determined presence of the user-selected attribute for generation of a switching decision. The integrated network switch also includes a switching module configured for generating the switching decision for the layer 2 type data frame based on the determined presence of the corresponding user-selected attribute and based on a corresponding user-defined switching policy. The host processor is configured for programming the port filter with the user-selected attribute and the switching module with the corresponding user-defined switching policy. Hence, the integrated network switch can be programmed to provide any type of switching operation (e.g., satisfying quality of service, latency, or minimum bandwidth requirements) based on the corresponding user-defined switching policy for any layer 2 type data packet having a detected user-selected attribute.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
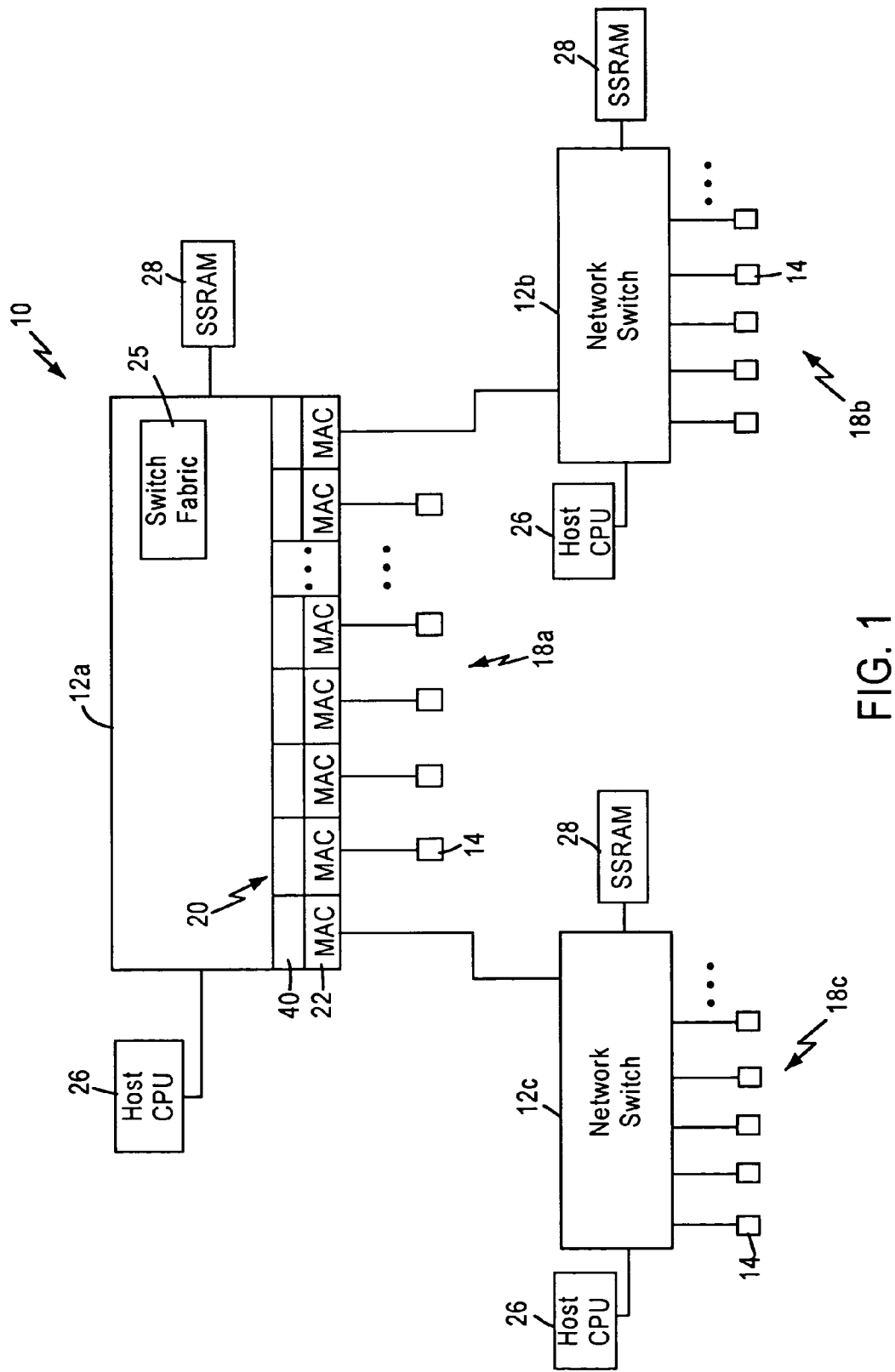
FIG. 1 is a block diagram of a packet switched network including multiple network switches for switching layer 2 type data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of layer 2 type data packets between network stations 14. Each network station 14, for example a client workstation, is typically configured for sending and receiving layer 2 type data packets at 10 Mbps or 100 Mbps according to IEEE 802.3 protocol. Each of the integrated multiport switches 12 are interconnected by gigabit Ethernet links 16, enabling transfer of layer 2 type data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives layer 2 type data packets to the associated network stations 14 across 10/100 Mbps physical layer (PHY) transceivers (not shown) according to IEEE 802.3u protocol, and port filters 40. Each port filter 40 is configured for identifying a user-selected attribute of the layer 2 type data frame, described below, and outputting the relevant switching information (e.g., whether the user-selected attribute was detected) to a switch fabric 25. The switch fabric 25 is configured for making frame forwarding decisions for received layer 2 type data packets. In particular, the switch fabric 25 is configured for layer 2 switching decisions based on MAC destination address, and priority information specified in the IEEE 802.1p (802.1D) VLAN field within the Ethernet (IEEE 802.3) header; the switch fabric 25 is also configured for implementation of user-defined switching policies based on detection of the user-selected attributes within the Ethernet packet, described in detail below.

As shown in FIG. 1, each switch 12 has an associated host CPU 26 and a buffer memory 28, for example an SSRAM. The host CPU 26 controls the overall operations of the corresponding switch 12, including programming of the port filters 40 and the switch fabric 25. The buffer memory 28 is used by the corresponding switch 12 to store layer 2 type data frames while the switch fabric 25 is processing forwarding decisions for the received layer 2 type data packets.

As described above, the switch fabric 25 is configured for performing layer 2 switching decisions and switching decisions that implement user-defined switching policies; such user-defined switching policies may include granting sufficient switch resources to ensure a guaranteed quality of service (e.g., reserved bandwidth or guaranteed latency) for a received layer 2 type data packet having a prescribed user-selected attribute, for example having been received on a selected ingress port, having a prescribed MAC or IP source or destination address, or having been determined to belong to a prescribed flow, for example an IGMP media flow. Use of policy-based switching decisions by the switch fabric 25, enables the switch fabric 25 to make intelligent decisions as far as how to handle a packet, including advanced forwarding decisions, and whether a packet should be considered a high-priority packet for latency-sensitive applications, such as video or voice.

Such policy-based switching decisions may be particularly important if a network station 14 is serving as a media source, such as a server providing a media stream of a news broadcast; in such a case, the host CPU 26 of the network switch 12 serving the media source may need to override level 2 priority designations in layer 2 type data packets from other network stations (e.g., workstation computers) in order to ensure quality of service for the media stream.

According to the disclosed embodiment, each port filter 40 of FIG. 1 is configured for identifying user-selected attributes, from a received layer 2 type data frame, that are used by the switching logic 25 to perform policy-based switching decisions. The port filter 40 can be implemented as a state machine that monitors the bytes coming in from the network, hence the state machine can analyze the layer 2 type data frame for the presence of prescribed user-selected attributes on a per-byte basis as the bytes of packet data of the data frame are received by the network switch port. In addition, the port filter 40 can be configured for multiple simultaneous comparisons of the incoming packet data with multiple templates that specify respective user-selected attributes, enabling the port filter 40 to simultaneously determine the presence of a plurality of user-selected attributes as the layer 2 type data frame is received.

Figure 2A:
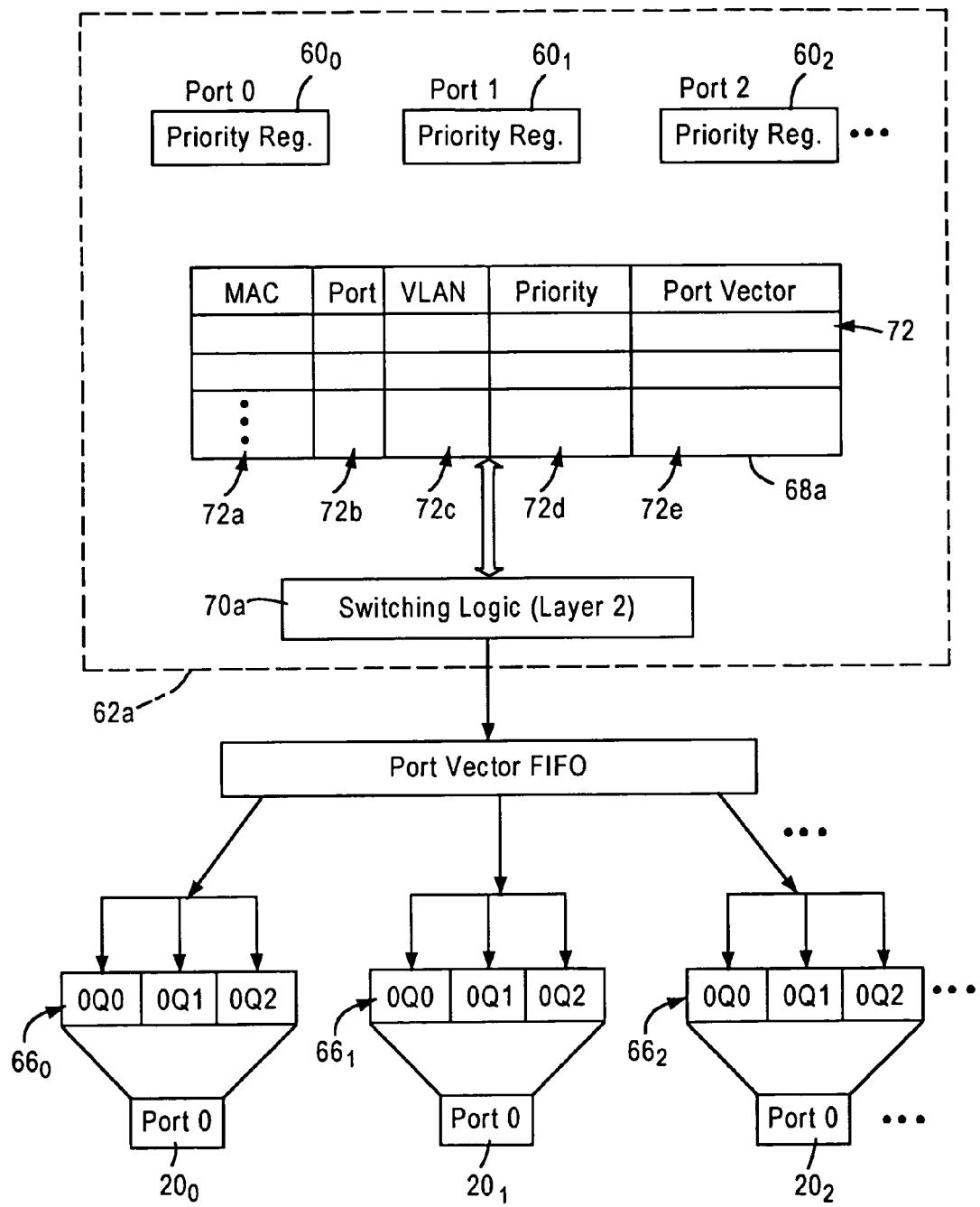
FIGS. 2A and 2B are diagrams illustrating alternative implementations of the integrated network switch of FIG. 1.
Figure 2B:
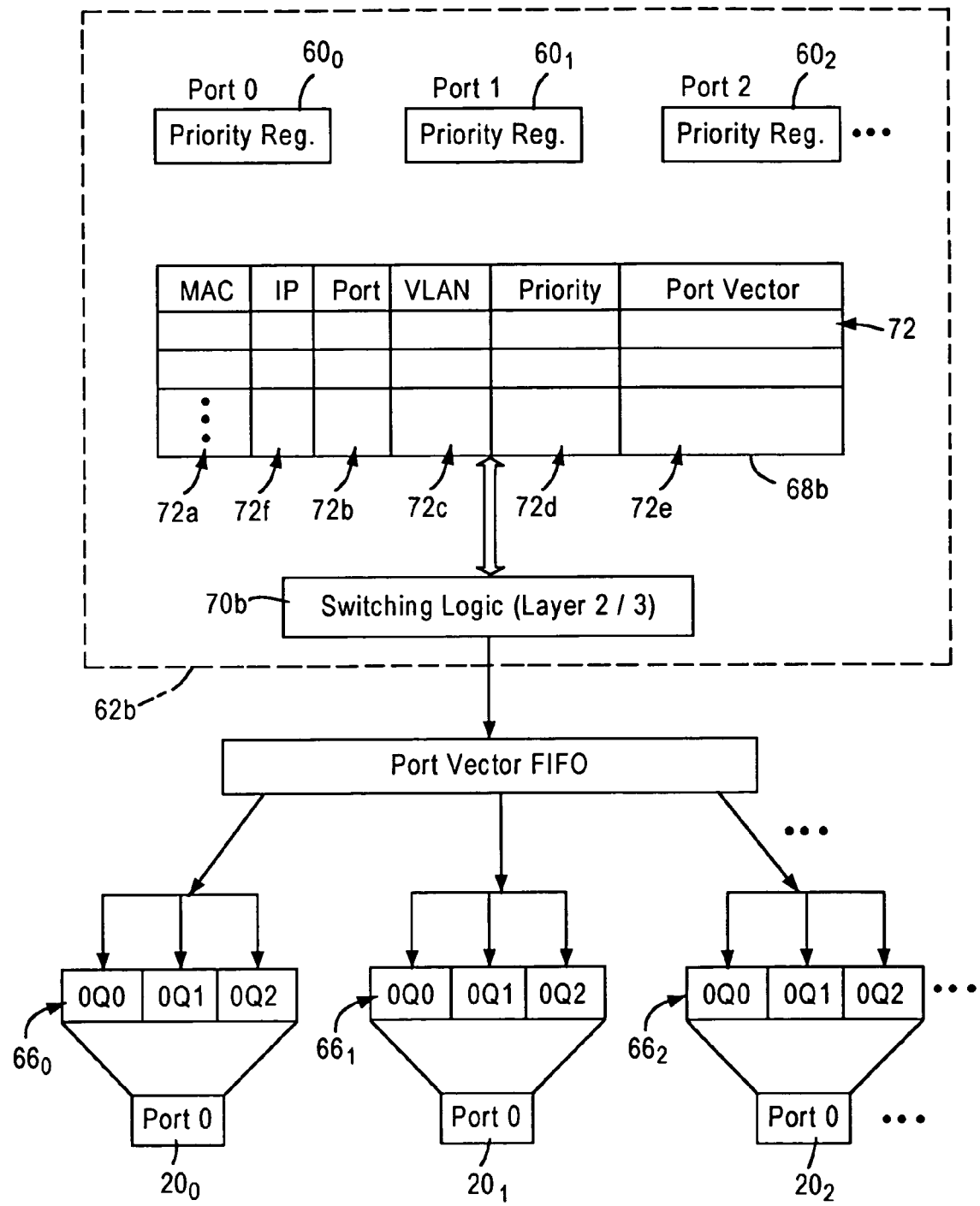

FIGS. 2A and 2B are diagrams illustrating in further detail alternative implementations of the network switch 12 according to an embodiment of the present invention. As shown in FIG. 2A, the network switch 12 includes a switching module 62, a port vector first and first out (FIFO) circuit 64, and a plurality of output queues 66 for each network switch port 20. FIG. 2A illustrates a layer 2 switching module 62a having a layer 2 switching table 68a and a layer 2 switching logic 70a, and FIG. 2B illustrates a layer 3 switching module 62b having a layer 3 switching table 68b and a layer 3 switching logic 70b.

The switching modules 62a and 62b each include a plurality of priority registers 60 for the respective network switch ports 20, programmable by the host CPU 26. The priority register 60 enables the user of the host CPU 26 to set a user-defined switching policy for priority-tagged IEEE 802.1Q frames by mapping a priority tag from a received layer 2 type data frame to one of the output queues 66 of a network switch port. In particular, an IEEE 802.1Q tagged frame received by the network switch 12 includes a 16-bit Tag Control Information (TCI) field having a three-bit user priority field; the three-bit user priority field specifies a priority value established by the transmitting network station 14. Assuming that the network switch 12 has for each network switch port 20 three output queues 66 (e.g., OQ0, OQ1, and OQ2) for low priority, medium priority, and high-priority frames, respectively, the priority register 60 for the network switch port 20 having received the layer 2 type data frame can map the three-bit user priority field to one of the three output queues 66. For example, the priority register 60 may specify that a layer 2 type data frame should be placed in a low priority queue (OQ0), medium priority queue (OQ1), or high-priority queue (OQ2) if the user priority field has a value in the range of 0-4, 5-6, and 7, respectively. Hence, the priority register 60 can be used to implement a user-defined switching policy for mapping priority-tagged layer 2 type data frames on a per-port basis.

Another feature of the disclosed embodiment is that the switching module 62 may be programmed by the host CPU 26 to implement user-defined switching policies independent of the priority information specified in the received layer 2 type data frame. For example, each priority register 60 can be programmed so that each layer 2 type data packet received on a corresponding network switch port 20 is automatically mapped to a prescribed priority, such as the high-priority queue (OQ2), regardless of the TCI field value in the layer 2 header.

The switching module 62 also includes a lookup table 68 configured for storing switching information for a received layer 2 type data packet, and switching logic 70. The switching logic 70 is configured for accessing the lookup table 68 for the appropriate switching information for the received layer 2 type data packet and generating a forwarding descriptor that specifies how the layer 2 type data packet should be switched (i.e., output) to the appropriate network switch port(s) 20. In particular, the forwarding descriptor includes a frame pointer that specifies the location(s) of the stored layer 2 type data frame in the buffer memory 28, and a port vector that specifies the network switch ports 20 to output to the layer 2 type data frame and the corresponding priority for each of the network switch ports 20.

The port vector FIFO 64, in response to receiving the forwarding descriptor from the switching logic 70, places the corresponding frame pointer into a selected one of the output queues 66 for each network switch port 20 designated by the port vector as being an output port for the layer 2 type data frame. Dequeuing logic (not shown) within the network switch 12 then fetches the frame data specified by the frame pointers stored in the output queues 66, and supplies the frame data to the network switch port 20 for transmission onto the network. As apparent from the foregoing, the dequeuing logic uses a priority-based scheduling scheme where the medium-priority queue (e.g., OQ1) of a network switch port 20 is not serviced until the corresponding high-priority queue (e.g., OQ2) has been serviced (i.e., emptied); similarly, the low-priority queue (e.g., OQ0) is not serviced until the corresponding medium-priority queue (e.g., OQ1) has been serviced. If desired, the dequeuing logic may also include inter-port scheduling schemes, where different network switch ports may be assigned different priorities or bandwidth values.

The lookup table 68 is configured for storing table entries 72 that specify switching information for a specific network station. In particular, each table entry of the layer 2 table 68a in FIG. 2A is configured for storing a MAC address 72a of a network station 14, a network switch port identifier 72b that specifies which network switch port 20 the corresponding network station can be located, a VLAN field 72d for the network station, a user-defined priority field 72d that specifies one of the priority queues (OQ0-2) for the corresponding MAC address and/or VLAN field, and a port vector field 72e that specifies the output port(s) for the corresponding MAC address and/or VLAN field. The layer 3 table 68b in FIG. 2B also includes an IP address 72f of the network station 14. Any one of the fields 72a, 72b, 72c, and/or 72f may be used to identify a network station 14 for switching information; for example, for layer 2 addressing, the switching logic 70a or 70b will search the lookup table 68a or 68b for table entries 72 that have a matching MAC address 72a for the source MAC address and/or the destination MAC address. The layer 3 switching logic 70b may perform layer 3 addressing by searching the lookup table 68b for table entries 72 that have a matching IP address 72b for the source IP address and/or the destination IP address.

The priority field 72d is used if the port-based priority registers do not already specify a per-port priority value. The switching logic 70, upon locating the matching table entries 72, generates a forwarding descriptor based on the priority field 72d and the port vector field 72e.

The switching logic 70 may also implement a user-defined priority in response to reception of a signal from a port filter 40 that a corresponding user-selected attribute has been detected within the layer 2 type data frame. In particular, a user of the host CPU 26 may specify that an Internet Group Management Protocol (IGMP) frame should receive a high priority with minimal latency; in such a case, the host CPU 26 would store an IGMP identifier in the port filter 40. The switching logic 70, in response to reception of the signal from the port filter 40 that the IGMP frame has been received, implements the corresponding user-defined switching policy (e.g., high priority) and bypasses the priority information in the priority register 60 or the priority field 72d. Note that the lookup table 68 may include a plurality of table entries 72 for each network station 14 having respective unique user-selected attributes and respective user-defined switching policies.

Figure 3:
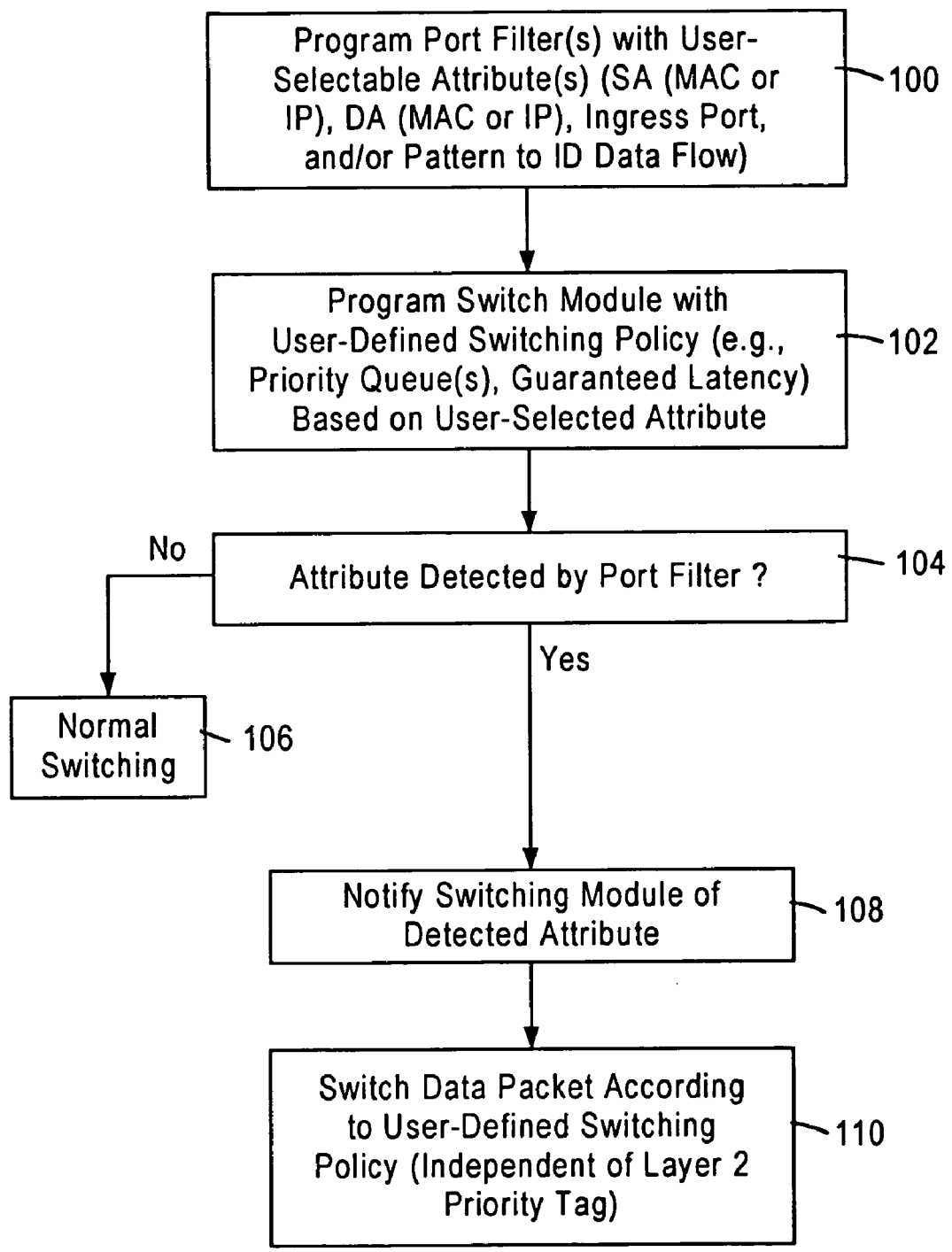
FIG. 3 is a diagram illustrating the method of programming the network switch and switching layer 2 type data packets according to user-defined switching policies based on detected user-selected attributes according to an embodiment of the present invention.

FIG. 3 is a diagram illustrating the method of implementing user-defined switching policies in the network switch 12 according to an embodiment of the present invention. The method begins in step 100 by the host CPU 26 programming a port filter 40 to identify a layer 2 type data frame according to a prescribed pattern in the incoming data stream. For example, the host CPU 26 may program the port filter 40 to identify a layer 2 type data frame based on any one of a MAC or IP source address, a MAC or IP destination address, or any other prescribed pattern in the payload of the IP frame, for example the presence of an IGMP frame. Typically, however, the port filter 40 would only need to be programmed to analyze bytes of the incoming data stream that cannot be parsed by the switching logic 70a and/or 70b, such that priority determination by the MAC addresses would be performed by the switching logic 70a and/or 70b, and IP-based priority determination need be performed by the port filter 40 only if the layer 2 switching logic 40a is used. As described above, the host CPU 26 may program the port filter 40 of each network switch port 20 to identify any one of a plurality of prescribed patterns, such that the port filter 40 may be able to distinguish between IGMP frames, SMTP frames, LDAP frames, etc.

The host CPU 26 then programs in step 102 the switch module 62 by loading the lookup table 68 with the attribute identifier(s) in the appropriate fields 72a, 72b, 72c, 72d, 72e, and 72f. As described above, the user-selected attribute may be any one of an ingress port, a source address, the destination address, or a prescribed pattern that specifies a certain data flow, for example IGMP frames. The user-defined switching policy may specify a priority queue, or a guaranteed latency, etc.

Once the network switch 12 has been programmed by the host CPU 26, the network switch 12 can begin switching operations. Each port filter 40 is configured for determining the presence of any one of a plurality of user-selected attributes in step 104. If no user-selected attribute is indicated by a port filter 40 as being detected, the switching logic 70 performs normal switching operations in step 106 by performing a MAC or IP address lookup in step 106. As described above, the switching logic 70a and/or 70b may prioritize switching of the layer 2 type data packet based on the corresponding priority register 60 or the corresponding priority field 72d.

If in step 104 a user-selected attribute is detected by the port filter 40, the port filter 40 notifies the switching module 62 of the detected user-selected attribute in step 108. The switching module 62 in response performs the switching according to the user-defined switching policy in step 210, independent of the layer 2 priority TCI tag.

According to the disclosed embodiment, layer 2 type data frames received by the network switch 12 can be switched according to user-defined switching policies based on the determined presence of a user-selected attribute, for example reception of the layer 2 type data frame on a prescribed ingress port, detecting a prescribed MAC or IP source address or destination address, or determining that the received layer 2 type data packet corresponds to a prescribed data flow. Hence, the network switch 12 can be configured for supporting user-selected data flows having a user-defined high priority that requires, for example, a guaranteed bandwidth or guaranteed latency. Hence, the network switch 12 can override priority designations within a received layer 2 type data frame based on the user-defined policies.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
    receiving a data frame by an integrated network switch;
    prioritizing switching of the data frame by the integrated network switch to an output port according to a user-defined policy and based on a user-selected attribute of the data frame; and
    the user-selected attribute having been detected within the data frame, the prioritizing switching including switching the data frame based on the user-selected attribute having been detected within the data frame, wherein the switching the data frame includes switching the data frame independent of priority information within the data frame.

2. The method of claim 1, wherein the integrated network switch includes a switching module configured for identifying a presence of an output port for each data frame based on at least one of a media access control (MAC) source address or a (MAC) destination address, the method further comprising configuring by a host processor, coupled to the network switch, the switching module to switch the data frame according to the user-defined policy based on the corresponding user-selected attribute.

3. The method of claim 2, wherein the step of configuring the switching module includes setting the user-selected attribute to a prescribed network switch port.

4. The method of claim 3, wherein the prioritizing step includes switching the received data frame according to the user-defined policy based on the data frame having been received on the prescribed network switch port.

5. The method of claim 2, wherein the step of configuring the switching module includes setting the user-selected attribute to at least one of a prescribed source address or a prescribed destination address.

6. The method of claim 5, wherein the setting step includes setting the user selected attribute to at least one of a prescribed MAC address or a prescribed Internet Protocol (IP) address.

7. The method of claim 6, wherein the prioritizing step includes switching the received data frame according to the user-defined policy based on the data frame having the at least one prescribed address.

8. The method of claim 2, wherein the integrated network switch includes a plurality of network switch ports, the method further comprising:
    detecting the user-selected attribute within the data frame by one of the network switch ports having received the data frame; and
    notifying by the one network switch port the detected presence of the user-selected attribute to the switching module, the switching module in response switching the data frame according to the user-defined policy.

9. The method of claim 8, further comprising configuring, by the host processor, the one network switch port for detection of the user-selected attribute.

10. The method of claim 9, wherein the step of configuring the one network switch port includes configuring the one network switch port for detection of a prescribed data flow.

11. A network switching system comprising:
    an integrated network switch including:
    (1) a plurality of network switch ports, each network switch port including a port filter configured for determining a presence of a user-selected attribute in a received layer 2 type data frame and outputting a signal indicating the determined presence of the user-selected attribute for generation of a switching decision, and
    (2) a switching module configured for generating the switching decision for the layer 2 type data frame based on the determined presence of the corresponding user-selected attribute and based on a corresponding user-defined switching policy; and
    a host processor configured for programming the port filter with the user-selected attribute and the switching module with the corresponding user-defined switching policy.

12. The system of claim 11, wherein the port filter is configured for determining the presence of the user-selected attribute independent of a presence of a priority tag within the received layer 2 type data frame.

13. The system of claim 12, wherein the host processor programs the port filter for identifying as the user-selected attribute at least one of a prescribed layer 2 source address, a prescribed layer 3 source address, a prescribed layer 2 destination address, or a prescribed layer 3 destination address.

14. The system of claim 11, wherein the integrated network switch further includes for each network switch port at least two output queues having respective priorities, the switching module identifying a selected one of the output queues for outputting the layer 2 type data frame based on the user-defined switching policy.

15. The system of claim 11, wherein the host processor programs the port filter for identifying, as the user-selected attribute, information within the layer 2 type data frame that specifies a prescribed data flow.

16. The system of claim 11, wherein the switching module includes priority registers, each priority register configured for mapping the received layer 2 type data frame of a corresponding network switch port to a switch priority value based on the user-defined switching policy, the switching module generating the switching decision for the layer 2 type data frame in accordance with the switch priority value.

17. The method of claim 1, wherein the prioritizing switching includes switching the data frame to the output port from one of a plurality of available output ports.

18. The method of claim 8, wherein the integrated network switch is implemented on a single chip.

19. The method of claim 1, wherein the integrated network switch is implemented on a single chip.

20. The system of claim 11, wherein the integrated network switch is implemented on a single chip.

* * * * *